United States Patent
Bhavaraju (10) Patent No.: US 9,620,994 B2
(45) Date of Patent: Apr. 11, 2017

(54) METHOD AND SYSTEM OF ANTI-ISLANDING OF A MICROGRID IN A GRID-CONNECTED MICROGRID SYSTEM

(71) Applicant: EATON CORPORATION, Cleveland, OH (US)

(72) Inventor: Vijay Bhavaraju, Germantown, WI (US)

(73) Assignee: EATON CORPORATION, Cleveland, OH (US)

(*) Notice: Subject to any disclaimer, the term of this patent is extended or adjusted under 35 U.S.C. 154(b) by 679 days.

(21) Appl. No.: 13/743,631

(22) Filed: Jan. 17, 2013

(65) Prior Publication Data

US 2014/0200722 A1    Jul. 17, 2014

(51) Int. Cl.
H02J 13/00    (2006.01)
H02J 3/38    (2006.01)

(52) U.S. Cl.
CPC .......... *H02J 13/0006* (2013.01); *H02J 3/381* (2013.01); *H02J 2003/388* (2013.01); *Y02E 40/72* (2013.01); *Y04S 10/12* (2013.01)

(58) Field of Classification Search
None
See application file for complete search history.

(56) References Cited

U.S. PATENT DOCUMENTS

| | | |
|---|---|---|
| 5,686,766 A | 11/1997 | Tamechika |
| 5,808,449 A | 9/1998 | Hirayama et al. |
| 5,892,664 A | 4/1999 | Vedder |
| 6,172,889 B1 | 1/2001 | Eguchi et al. |
| 6,219,623 B1 | 4/2001 | Wills |
| 6,429,546 B1 | 8/2002 | Ropp et al. |
| 6,603,290 B2 | 8/2003 | Hochgraf |
| 6,801,442 B2 | 10/2004 | Suzui et al. |
| 6,810,339 B2 | 10/2004 | Wills |
| 6,815,932 B2 | 11/2004 | Wall |

(Continued)

OTHER PUBLICATIONS

Lasseter et al., "Integration of Distributed Energy Resources the MicgroGrid Concept", Apr. 2002, California Energy Commission, CERTS MicroGrid White Paper, p. 1-32.*

(Continued)

*Primary Examiner* — Mohammad Ali
*Assistant Examiner* — Saad M Kabir
(74) *Attorney, Agent, or Firm* — Eckert Seamans; Philip Levy (57) ABSTRACT

A system for detecting islanding of a microgrid includes a number of power sources to output real power and controlled reactive power injection; a number of controllers each controlling one of the number of power sources; and an output from the microgrid powered by the number of power sources. A number of electrical switching apparatus electrically connect the output from the microgrid to a grid and electrically disconnect the output from the microgrid from the grid. A microgrid controller detects islanding of the microgrid with respect to the grid, and sends a number of commands to a number of the number of controllers in order to control reactive power injection by a number of the number of power sources. A communication channel is between the microgrid controller and the number of controllers. A number of microgrid loads are powered by the output from the microgrid.

21 Claims, 4 Drawing Sheets

(56) References Cited

U.S. PATENT DOCUMENTS

| | | |
|---|---|---|
| 6,850,074 B2 | 2/2005 | Adams et al. |
| 6,853,940 B2 | 2/2005 | Tuladhar |
| 6,864,595 B2 | 3/2005 | Wall |
| 6,882,904 B1 * | 4/2005 | Petrie et al. .................. 700/295 |
| 7,015,597 B2 | 3/2006 | Colby et al. |
| 7,016,793 B2 | 3/2006 | Ye et al. |
| 7,106,564 B2 | 9/2006 | Deng et al. |
| 7,116,010 B2 | 10/2006 | Lasseter et al. |
| 7,138,728 B2 | 11/2006 | LeRow et al. |
| 7,161,257 B2 | 1/2007 | Lakov et al. |
| 7,183,667 B2 | 2/2007 | Colby et al. |
| 7,202,638 B2 | 4/2007 | Ye et al. |
| 7,225,087 B1 | 5/2007 | Siciliano et al. |
| 7,227,278 B2 | 6/2007 | Realmuto et al. |
| 7,248,946 B2 | 7/2007 | Bashaw et al. |
| 7,271,571 B2 | 9/2007 | Ye et al. |
| 7,275,002 B2 | 9/2007 | Huang et al. |
| 7,304,403 B2 | 12/2007 | Xu |
| 7,365,444 B2 | 4/2008 | Lakov et al. |
| 7,376,491 B2 | 5/2008 | Walling et al. |
| 7,408,268 B1 | 8/2008 | Nocentini et al. |
| 7,427,815 B1 | 9/2008 | Ye et al. |
| 7,432,618 B2 | 10/2008 | Taylor |
| 8,334,618 B2 | 12/2012 | Bhavaraju et al. |
| 2002/0047699 A1 * | 4/2002 | Katoh .................. H02J 3/38 324/76.39 |
| 2005/0135031 A1 | 6/2005 | Colby et al. |
| 2005/0213272 A1 | 9/2005 | Kobayashi |
| 2007/0143044 A1 | 6/2007 | Huang et al. |
| 2007/0273338 A1 | 11/2007 | West |
| 2008/0122293 A1 | 5/2008 | Ohm |
| 2008/0278000 A1 | 11/2008 | Capp et al. |
| 2009/0021877 A1 | 1/2009 | Fornage et al. |
| 2009/0059631 A1 | 3/2009 | Krein |
| 2012/0215368 A1 * | 8/2012 | Sharma .................. 700/287 |

OTHER PUBLICATIONS

Beckwith Electric Co., Inc., "Intertie/Generator Protection Relay M-3410A" Integrated Protection System®, 2001, 22 pp.

* cited by examiner

METHOD AND SYSTEM OF ANTI-ISLANDING OF A MICROGRID IN A GRID-CONNECTED MICROGRID SYSTEM

BACKGROUND

Field

The disclosed concept pertains generally to power distribution systems and, more particularly, to systems, such as microgrid systems, that detect unintentional islanding of a microgrid. The disclosed concept further pertains to methods of detecting islanding and, more particularly, to methods of detecting islanding for a microgrid system.

Background Information

In electric utility systems, a grid outage condition can cause the creation of an "unintentional island" including the electrical load(s) and the power generation source(s). Such an island is undesirable and is of a particular concern in distributed power generation systems having a number of power generation sources and loads coexisting on a distribution feeder. For example, such an island can result in an abnormal voltage or frequency being supplied to the load. Furthermore, through back-feeding, such an island can present a safety hazard to workers for upstream power circuits.

When a microgrid is electrically connected to the utility grid, it is necessary to match the microgrid frequency and voltage amplitude with that of the grid. The microgrid uses the grid as its reference and generates an output voltage that is synchronized with the grid. If the grid becomes electrically disconnected, then the microgrid does not see any change in frequency or voltage and will continue to supply power if the output power of the microgrid matches with the local load demand on the grid. Such a condition is known as islanding, which can have substantial safety and performance implications.

Figure 1:
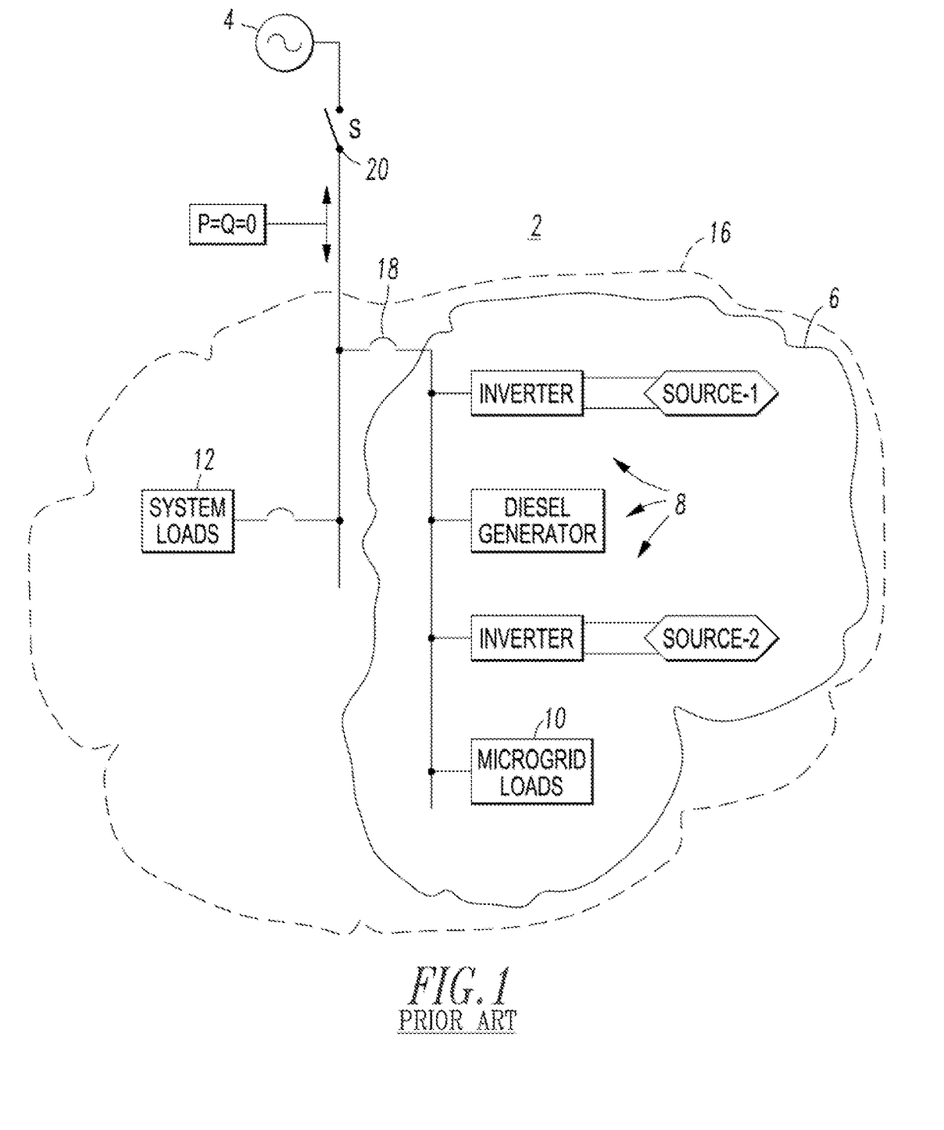
FIG. 1 is a block diagram of a power distribution system including a utility grid and a microgrid.

FIG. 1 shows a power distribution system 2 including an example utility grid 4 and a microgrid 6. Depending on the place of loss of electrical connection to a grid (e.g., without limitation, the utility grid 4 of FIG. 1; a non-utility grid (not shown)), in a microgrid, such as 6, the power output from a number of available microgrid power sources 8 (e.g., without limitation, a number of inverters and a corresponding number of inverter-based power sources; a diesel generator) may be equal to the power input by a number of available microgrid loads 10 within the microgrid 6 and a number of other system loads 12 outside of the microgrid 6, but still on the connected grid 4. When the power input by the number of system loads 12 and the number of microgrid loads 10 together equals the power output from the number of microgrid power sources 8 within the microgrid 6, the real and reactive power into the grid 4 can be zero (e.g., P=Q=0). Switch S provides a point 20 of loss of connection to the grid 4, which is a safety hazard. For example, when the switch S is opened and the microgrid isolation switch 18 is closed, an unintentional island 16 is formed. The real and reactive power through the upstream switch S is zero. Hence, there is the possibility that if a lineman opens the switch S, the point 20 of the switch S has a voltage. This is a safety hazard for the lineman.

The standard IEEE 1547 addresses the requirement for anti-islanding of distributed resources. However, the above problem is for anti-islanding of a microgrid or a number of power sources working closely within a microgrid.

There is room for improvement in microgrid systems.

There is also room for improvement in anti-islanding methods.

SUMMARY

These needs and others are met by embodiments of the disclosed concept in which, for example, a number of electrical switching apparatus electrically connect an output from a microgrid to a grid and electrically disconnect the output from the microgrid from the grid. A microgrid controller detects islanding of the microgrid with respect to the grid, and sends a number of commands to a number of controllers in order to control reactive power injection by a number of power sources of the microgrid.

In accordance with one aspect of the disclosed concept, a system for detecting islanding of a microgrid comprises: a number of power sources, each of the number of power sources being structured to output real power, and to output controlled reactive power injection; a number of controllers, each of the number of controllers being structured to control one of the number of power sources; an output from the microgrid powered by the number of power sources; a number of electrical switching apparatus structured to electrically connect the output from the microgrid to a grid and electrically disconnect the output from the microgrid from the grid; a microgrid controller structured to detect islanding of the microgrid with respect to the grid, and to send a number of commands to a number of the number of controllers in order to control reactive power injection by a number of the number of power sources; a communication channel between the microgrid controller and the number of controllers; and a number of microgrid loads powered by the output from the microgrid.

As another aspect of the disclosed concept, a method of anti-islanding of a microgrid including a plurality of power sources having an output to a plurality of microgrid loads comprises: commanding by a processor a number of the power sources or a number of the microgrid loads to inject a unidirectional reactive power dither with respect to the output; detecting a rate of change of frequency of an alternating current voltage of the output caused by the unidirectional reactive power dither; and if the rate of change of frequency is greater than a predetermined value, commanding each of the power sources to output additional reactive power in a same direction with respect to the output.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a controller; a workstation; a personal computer; a microprocessor; a microcontroller; a microcomputer; a central processing unit; a mainframe computer; a mini-computer; a server; a networked processor; or any suitable processing device or apparatus.

As employed herein, the term "microgrid" shall mean a localized group of a number of power sources (e.g., electricity generation and/or energy storage) and a number of loads that normally operates electrically connected to a conventional grid (e.g., a centralized power distribution system; a utility grid). A single point of common electrical connection of the microgrid to the conventional grid can be electrically disconnected as a group together from the utility grid.

Figure 2:
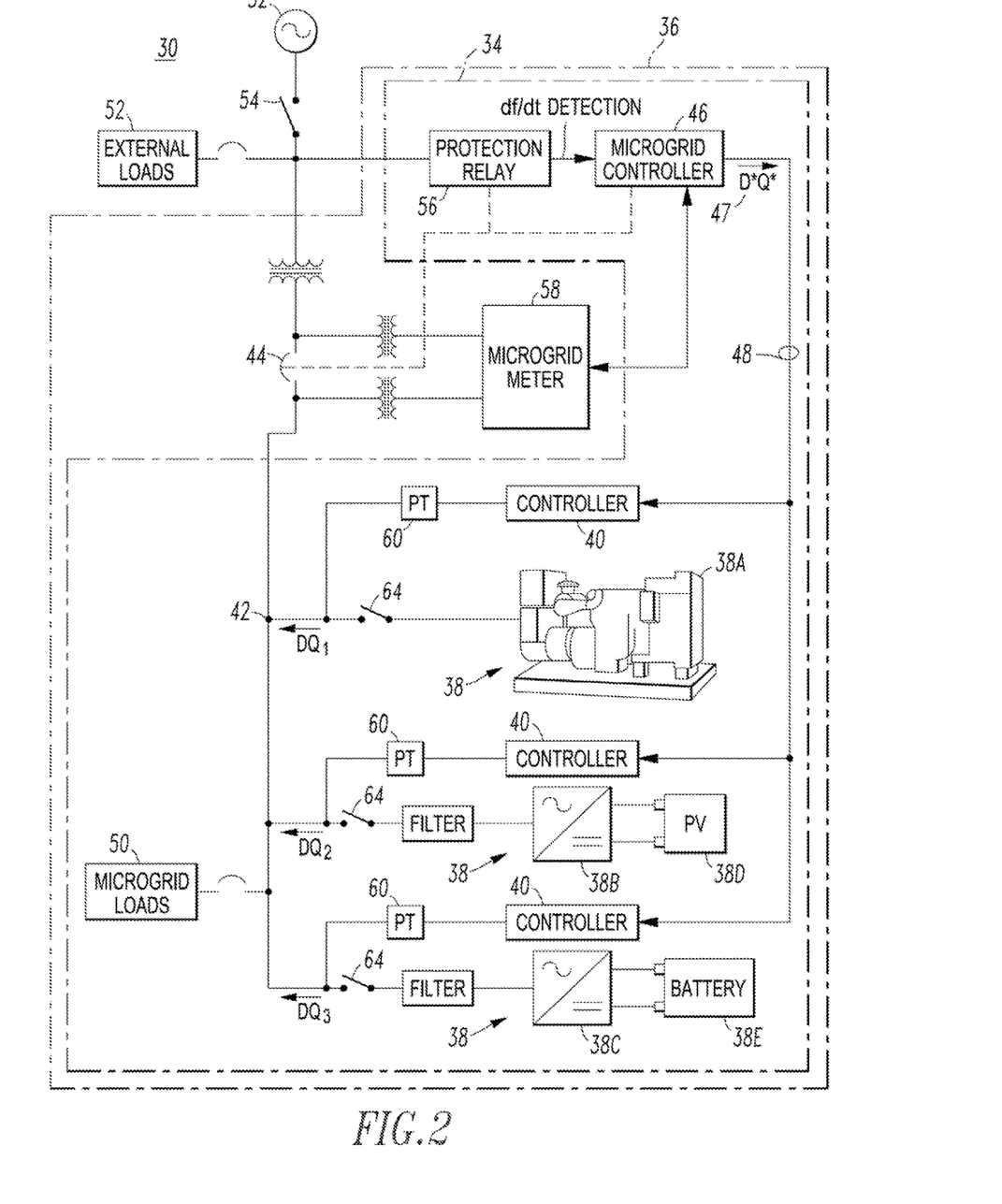
FIG. 2 is a block diagram of a power distribution system including a utility grid and a microgrid in accordance with embodiments of the disclosed concept.

FIG. 2 shows a power distribution system 30 including a grid, such as the example utility grid 32, and a microgrid 34. A system 36 for detecting islanding of the microgrid 34 includes a number of power sources 38 (e.g., without limitation, a plurality of different power sources), each of which is structured to output real power, and to output controlled reactive power injection for islanding detection, as will be discussed. The system 36 also includes a number of controllers 40, each of which is structured to control one of the number of power sources 38. An output 42 from the microgrid 34 is powered by the number of power sources 38. A number of electrical switching apparatus, such as the example microgrid disconnection switch 44, are structured to electrically connect the output 42 from the microgrid 34 to the example utility grid 32 and electrically disconnect the output 42 from the utility grid 32. The system 36 further includes a microgrid controller 46 structured to detect islanding of the microgrid 34 with respect to the example utility grid 32, and to send a number of commands 47 to the number of controllers 40 in order to control reactive power injection by the number of power sources 38. A communication channel 48 is between the microgrid controller 46 and the number of controllers 40. A number of microgrid loads 50 within the microgrid 34 are powered by the output 42 of the microgrid 34.

In the example power distribution system 30, a number of external loads 52 are not part of the microgrid 34, but have the same upstream pole switch 54, which can electrically disconnect both the number of external loads 52 and the microgrid 34 from the example utility grid 32. When the example pole switch 54 is open, the microgrid 34 and the number of external loads 52 together become part of the load on the downstream side of the pole switch 54. If the microgrid generated power, and the sum of power consumed by the number of microgrid loads 50 and the number of external loads 52 are equal, then the power system downstream of the pole switch 54 becomes an unintentional island.

The example microgrid 34 includes active anti-islanding controls and islanding detection, as will be described.

Example 1

The number of power sources 38 are a plurality of power sources as shown in FIG. 2. The number of controllers 40 are a plurality of controllers 40. The microgrid controller 46, as will be described, is further structured to command each of the controllers 40 together within the microgrid 34.

Example 2

The number of commands from the microgrid controller 46 are a plurality of commands 47 including a real power command and a reactive power command periodically sent from the microgrid controller 46 to each of the controllers 40 over a communication channel 48. As will be described, a reactive power value of the reactive power command is perturbed by a predetermined percentage of the reactive power value of the reactive power command at a predetermined frequency, which is substantially less than a frequency of an alternating current voltage of the output 42.

Example 3

The controlled reactive power injection is a function (e.g., without limitation, 2% of the real power at a frequency of less than 1 Hz) of the real power, and independent of a predetermined power factor output from the microgrid 34. The perturbation of the reactive power value output by each of the power sources 38 is time synchronized between the power sources 38 within the microgrid 34.

Example 4

Each of the number of commands 47 sent by the microgrid controller 46 is a digital signal.

Example 5

Each of the number of commands 47 sent by the microgrid controller 46 is sent through the example communication channel 48.

Example 6

Each of the number of commands 47 (e.g., without limitation, an excitation command for a diesel or natural gas generator 38A; a reactive current command for an inverter 38B,38C) causes a corresponding predetermined function (e.g., without limitation, an excitation function for the diesel or natural gas generator 38A; a reactive current function for the inverter 38B,38C) within a corresponding one of the number of controllers 40.

Example 7

The islanding is detected by each of the number of controllers 40.

Example 8

The islanding is detected by an external protection relay 56 cooperating with the microgrid controller 46, as will be explained.

Example 9

The external protection relay 56 is structured to measure a rate of change in frequency (df/dt) of an alternating current voltage of the output 42, and report the rate of change exceeding a predetermined value to the microgrid controller 46. The microgrid controller 46 is further structured to responsively change the number of commands 47 to increase or decrease a value of reactive power commanded by the number of commands 47 to the number of power sources 38.

Example 10

The microgrid controller 46 is further structured to control with a frequency (e.g., without limitation, about 0.5 Hz to about 1.5 Hz) a reactive power dither caused by the number of commands 47 and a measurement of a rate of change in frequency (e.g., without limitation, about 20 mHz per second) by the external protection relay 56 of the alternating current voltage of the output 42.

Example 11

One of the external protection relay 56 and the microgrid controller 46 is structured to detect the rate of change in frequency and a frequency of the alternating current voltage of the output 42.

Example 12

As will be explained, below, in connection with FIG. 3, a number of controllers 40 are structured to detect islanding and either follow a corresponding one of the number of commands 47 and shut down, or follow an island mode operation command from the microgrid controller 46.

Example 13

As will be explained, below, in connection with FIG. 3, a corresponding one of the number of commands 47 includes one of a positive reactive power value corresponding to reactive capacitive power out of a corresponding one of the number of power sources 38, and a negative reactive power value corresponding to reactive inductive power into the corresponding one of the number of power sources 38. A corresponding one of the number of controllers 40 is structured to determine if a frequency of an alternating current voltage of the output 42 is below a first setpoint and continue to shut down or continue to follow an island mode operation command for the positive reactive power value, or to determine if the frequency of the alternating current voltage of the output 42 is above a second setpoint, which is larger than the first setpoint, and continue to shut down or continue to follow the island mode operation command for the negative reactive power value.

Example 14

A number of the number of commands 47 defines a value of the controlled reactive power injection.

Example 15

One of the number of microgrid loads 50 is a controllable reactive load. One of the number of commands 47 causes the controllable reactive load to turn on in order to cause the controlled reactive power injection.

Example 16

One of the number of microgrid loads 50 is a controllable power factor correction capacitor bank.

Example 17

The number of power sources 38 are a plurality of power sources 38 selected from the group consisting of a generator set 38A (genset) (e.g., without limitation, diesel; natural gas), a battery 38E and an inverter 38C, and a photovoltaic array 38D and an inverter 38B.

Example 18

One of the number of electrical switching apparatus 44 is a microgrid disconnect switch 44 structured to electrically disconnect the output 42 from the microgrid 34 to the grid 32. The microgrid controller 46 is further structured to open the microgrid disconnect switch 44 and island the microgrid 34. Each of the number of controllers 40 is structured to monitor a frequency of an alternating current voltage of the output 42 and stop following a corresponding one of the number of commands 47 to the number of controllers 40 after the monitored frequency reaches a predetermined frequency value.

Example 19

One of the number of electrical switching apparatus 44 is a microgrid disconnect switch 44 structured to electrically disconnect the output 42 from the microgrid 34 to the grid 32. The microgrid controller 46 is further structured to cooperate with the microgrid disconnection switch 44 to electrically disconnect the output 42 from the grid 32, and a microgrid meter 58 structured to measure reactive power flowing from the output 42 to the grid 32 or from the grid 32 to the output 42.

Each of the controllers 40 senses the alternating current voltage of the output 42 through a corresponding potential transformer (PT) 60. The output of each of the number of power sources is electrically connected to the output 42 of the microgrid 34 by a contactor or circuit breaker 64.

Example 20

The number of electrical switching apparatus 44 include a microgrid disconnection switch 44 electrically connected to the output 42. A number of external loads 52, not part of the microgrid 34, are electrically connected upstream of the microgrid disconnection switch 44.

Example 21

Based on the real and reactive power being exported or imported by the number of power sources 38 within the microgrid 34 (e.g., only the example battery 38E can import power), the microgrid controller 46 outputs D* and Q* commands 47 to the controllers 40 of the controllable power sources 38. The D* and Q* commands 47 are real and reactive power commands, respectively, which are sent over the example communication channel 48 from the microgrid controller 46 to each of the controllable power sources 38. The D* and Q* commands 47 are based on the power output capacity of each of the power sources 38. For example and without limitation, since the example PV inverter 38B maximizes its power output, the D* and Q* commands 47 are updated every one second or less.

At each instant of updating the D* and Q* commands 47, the Q* command is perturbed by a suitable percentage of the reactive power demand. For example, the reactive power Q (Q_mg) demanded by the number of microgrid loads 50 is obtained from: (1) the reactive power (Q_mm) measured by the microgrid meter 58; and (2) the reactive power exported/imported (Q_exp) by the power sources 38 within the microgrid 34 (e.g., Q_exp=Q_mg+Q_mm; or Q_mg=Q_exp−Q_mm). The microgrid controller 46 obtains the real and reactive power (P_mm, Q_mm) out of the microgrid 34 from the microgrid meter 58 and also knows the power generated (P_exp, Q_exp) by the power sources 38 within the microgrid 34 from the individual controllers 40. Hence, the microgrid controller 46 continuously knows the power load (P_mg, Q_mg) of the number of microgrid loads 50 within the microgrid 34 as well as the power being exported (P_mm, Q_mm) to the number of external loads 52 and/or the example utility grid 32.

DQ1, DQ2 and DQ3 are the actual real and reactive power outputs of the respective power sources 38A,38B,38C. For example, for the battery power source 38C,38E, which can be charged or discharged, the real power D* command can be positive (discharge) or negative (charge). The reactive power Q* command can provide an inductive or a capacitive perturbation (i.e., an inductive or a capacitive VAR increase). A positive Q value is reactive power out of the power source 38C and is capacitive, and a negative Q value is reactive power into the power source 38C and is inductive. The values commanded by the D* and Q* commands 47 can be the same for all power sources 38, or each power source 38 can receive a different set of D* and Q* commands 47.

Increasing a positive Q value reduces the (resonant) islanded system frequency, and decreasing a positive Q value increases the frequency. Increasing a positive Q value will also increase the terminal voltage of the output 42, but the increase will depend on the line impedance.

The protection relay 56 is programmed to measure the rate of change of frequency (df/dt). In a utility connected system, the perturbation in the Q* command will not result in any frequency change and the protection relay 56 will essentially see no rate of change of frequency (df/dt), since, for example, the frequency of the example utility grid 32 is quite stable.

When the pole switch 54 is open and the sum of the power consumed by the number of microgrid loads 50 and the power consumed by the number of external loads 52 equals the power commanded by the D* and Q* commands 47, then the perturbation in the Q* value imposed on the power sources 38 will result in a frequency change since the actual power load and the real and reactive power commanded by the D* and Q* commands 47 are mismatched. The protection relay 56 will detect a change in frequency and report it to the microgrid controller 46. Upon receiving a df/dt fault flag from the protection relay 56, the microgrid controller 46 will increase or decrease the Q* value of the Q* command to the power sources 38 within the microgrid 34. The power source controllers 40 will monitor the islanded system frequency and stop following the Q* command after the microgrid system frequency reaches a pre-determined frequency setpoint. The microgrid controller 46 will, however, open the microgrid disconnect switch 44 and island the microgrid 34.

Example 22

The Q* value of the Q* command is not held constant, but is perturbed by, for example and without limitation, 2% of Q_mg.

Example 23

The microgrid system 30 performs the following anti-islanding functions:

First, the microgrid controller 46 commands at least one power source 38 to inject a unidirectional reactive power dither (e.g., this can be done from any one microgrid power source 38 that can be controlled to perturb the kVAR).

When the example utility grid 32 is present, this command will only slightly change the reactive power reference (e.g., without limitation, about 2% over half a second).

If the example utility grid 32 is absent, then the unidirectional reactive power dither will introduce a change in the frequency of the microgrid 34 and any loads (e.g., 50 or 52) electrically connected to it up to the point of connection (e.g., without limitation, the downstream side of the example pole switch 54).

The protection relay 56 will then detect a change in frequency. The protection relay 56 is programmed to detect the rate of change of frequency (df/dt) expected for the reactive power dither introduced.

When the rate of change of frequency (df/dt) greater than a predetermined value is detected, the microgrid controller 46 commands each or at least some of the microgrid power sources 38 with additional reactive power (e.g., without limitation, up to 20% of the real power) in the same direction. A negative reactive power change into the connected microgrid 34 will result in an increase in frequency, and a positive reactive power change will result in a decrease in frequency.

For example, the additional injection of reactive power into the connected microgrid 34 will drive the frequency of the microgrid 34 to a value that can be detected by the over or under frequency trip setting of the protection relay 56. This is the normal setpoint for the protection relay 56. The holding of the reactive power command is desired to enable the microgrid 34 to island after it is electrically disconnected from the example utility grid 32.

During this time, depending on the load impedance, the system voltage of the output 42 can also increase or decrease and cause an over or under voltage trip, respectively, as also detected by the protection relay 56.

The reactive power dither (the additional reactive power is added only when the dither results in a frequency change df/dt) will result in any significant grid voltage abnormality when the example utility grid 32 is present.

Example 24

Figure 3:
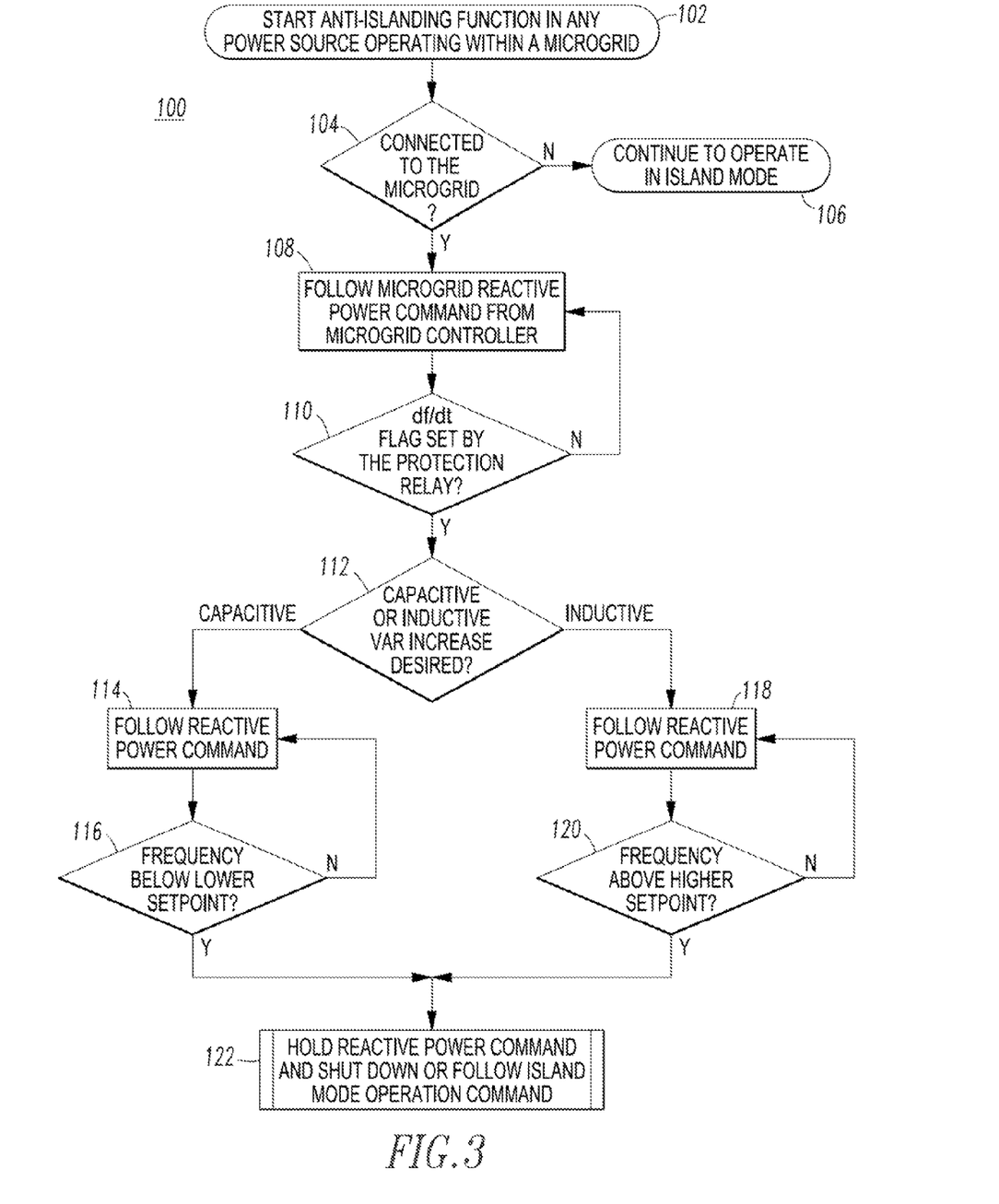
FIG. 3 is a flowchart of an anti-islanding routine for one of the power source controllers of FIG. 2.

FIG. 3 shows an anti-islanding routine 100 for one of the power source controllers 40 of FIG. 2. This routine 100 operates the controller 40 to detect an unintentional island and shut down or operates in an island mode with other microgrid sources when a corresponding one of the number of the power sources 38 is electrically connected to the microgrid 34, and follows a microgrid real and reactive power command from a suitable processor, such as the example microgrid controller 46.

As was discussed above in connection with FIG. 2, the example microgrid controller 46 commands a number of the power sources 38 or a number of the microgrid loads 50 to inject a unidirectional reactive power dither with respect to the output 42. The unidirectional reactive power dither changes a value of reactive power with respect to the output 42 by a predetermined value within a predetermined time. The protection relay 56 detects a rate of change of frequency of an alternating current voltage of the output 42 caused by the unidirectional reactive power dither and reports this rate of change to the microgrid controller 46, If this rate of change is greater than a predetermined value, then the microgrid controller 46 commands a number or each of the power sources 38 to output additional reactive power in a same direction with respect to the output 42.

First, at 102 of the routine 100, an anti-islanding function is started in any power source controller 40 operating within the microgrid 34. Next, at 104, it is determined if the corresponding power source 38 is electrically connected to the microgrid 34 (e.g., the corresponding contactor or circuit breaker 64 is closed). If not, then the power source 38 continues to operate in an island mode at 106. Otherwise, at 108, the controller 40 follows a microgrid reactive power command from the microgrid controller 46. Then, at 110, it is determined if the df/dt flag is set by the protection relay 56. If not, then step 108 is repeated. The power sources 38 can just follow the commands from the microgrid controller 46 and need not know about the df/dt flag. In a perfect microgrid, the power sources 38 (and loads 50) may not see a difference with the grid connected or disconnected.

Otherwise, it is determined, at 112, if a capacitive or an inductive VAR increase is desired. If a capacitive VAR increase is desired (i.e., a positive Q value is reactive power out of the power source 38 and is capacitive), then the reactive power command is followed at 114. Then, at 116, it is determined if the frequency of the alternating current voltage of the output 42 as sensed through the corresponding potential transformer 60 is below a lower frequency setpoint. If not, then step 114 is repeated. Otherwise, at 112, if an inductive VAR increase is desired (i.e., a negative Q value is reactive power into the power source 38 and is inductive), then the reactive power command is followed at 118. Then, at 120, it is determined if the frequency of the alternating current voltage of the output 42 as sensed through the corresponding potential transformer 60 is above a higher frequency setpoint. If not, then step 118 is repeated.

If either of the tests at 116 or 120 is true, then, at 122, the controller 40 either holds the reactive power command and shuts down, or follows an island mode operation command from the microgrid controller 46. For the first alternative, there is no island mode operation command. As detected at either 116 or 120, the frequency of the alternating current voltage of the output 42 has shifted to a predetermined range or value (e.g., without limitation, a normal setpoint for the protection relay 56). The protection relay 56 sends a command to the microgrid disconnection switch 44 to open and thus isolate the microgrid power sources 38 and loads 50 from the grid 32. This removes the hazardous voltage at the example pole switch 54. For the second alternative, there is an island mode operation command from the microgrid controller 46. By following this island mode operation command, the controller 40 makes sure that the frequency of the alternating current voltage of the output 42 does not run away when the microgrid 34 is electrically disconnected from the example utility grid 32. This allow the power sources 38 and the number of microgrid loads 50 within the microgrid 34 to operate in an island. Step 122 is responsive to the frequency change caused by the unidirectional reactive power dither. After step 116 or step 120 detects the frequency of the alternating current voltage of the output 42 exceeding a predetermined frequency, step 122 electrically disconnects the microgrid 34 from the example utility grid 32 and enables the microgrid 34 to island.

Example 25

Figure 4:
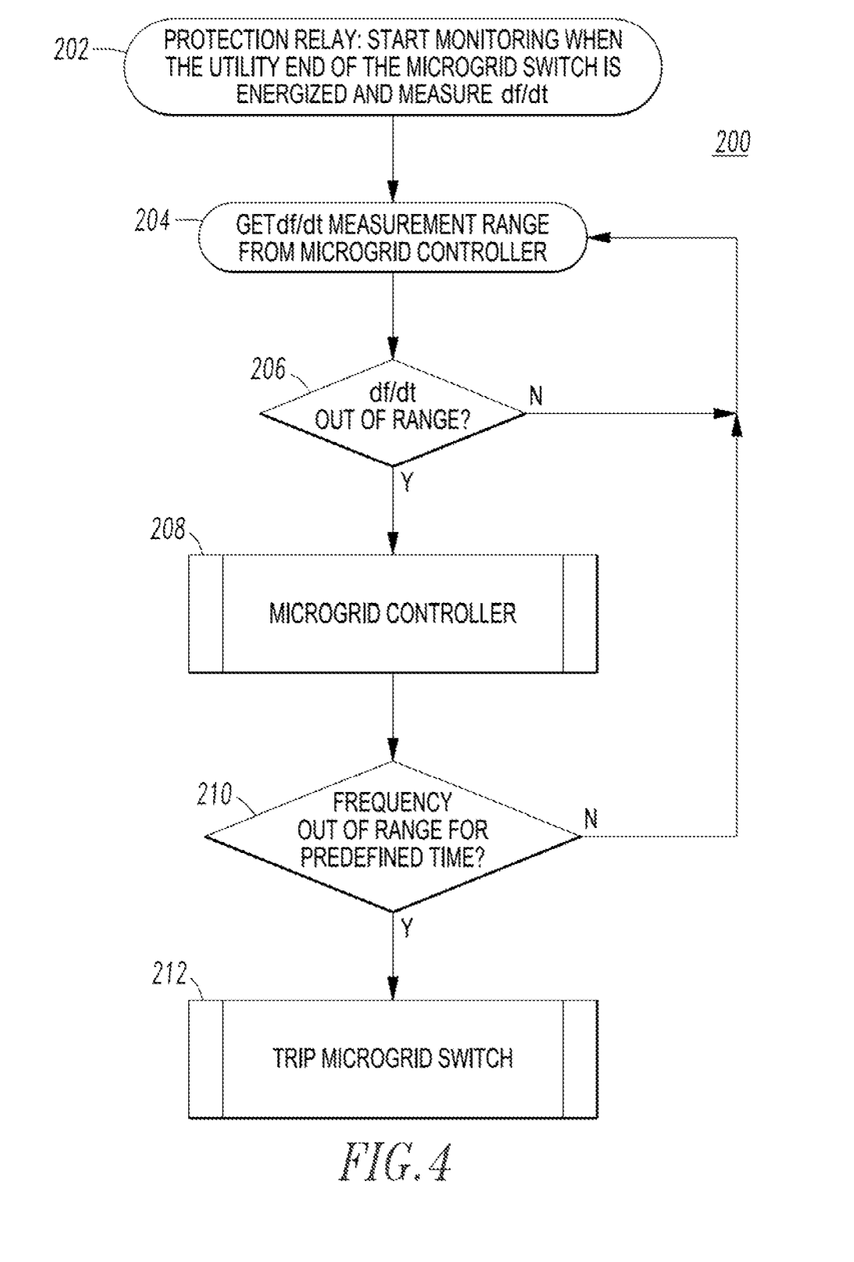
FIG. 4 is a flowchart of an anti-islanding routine for the microgrid controller and the protection relay of FIG. 2.

FIG. 4 shows an anti-islanding routine 200 for the microgrid controller 46 and the protection relay 56 of FIG. 2. First, at 202, the protection relay 56 starts monitoring when the utility end of the microgrid disconnection switch 44 is energized and measures df/dt. Next, at 204, the protection relay 56 gets the df/dt measurement range from the microgrid controller 46. Then, at 206, the protection relay 56 determines if the df/dt value is out of range. If not, at 206, then step 204 is repeated. Otherwise, the df/dt out of range flag is sent to the microgrid controller 46 at 208. Next, at 210, the microgrid controller 46 determines if the frequency is out of range for a predetermined time. Steps 114 and 116 or 118 and 120 of FIG. 3 change the frequency and this is used by the microgrid controller 46. If the frequency is not out of range at 210, then step 204 is repeated. Otherwise, at 212, the microgrid disconnection switch 44 is tripped open. This electrically disconnects the microgrid 34 from the example utility grid 32.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system for detecting islanding of a microgrid, said system comprising:

a number of power sources, each of said number of power sources being structured to output real power, and to output controlled reactive power injection;

a number of controllers, each of said number of controllers being structured to control one of said number of power sources;

an output from said microgrid powered by said number of power sources;

a number of electrical switching apparatus structured to electrically connect said output from said microgrid to a grid and electrically disconnect said output from said microgrid from the grid;

a microgrid controller structured to detect islanding of said microgrid with respect to the grid, and, in response to detecting islanding of said microgrid, to send a number of commands to a number of said number of controllers in order to control reactive power injection by a number of said number of power sources, wherein said number of commands are a plurality of commands including a real power command and a reactive power command periodically sent from said microgrid controller to each of said controllers over said communication channel, and wherein a reactive power value of said reactive power command is perturbed by a predetermined percentage of the reactive power value of said reactive power command at a predetermined frequency, which is less than a frequency of an alternating current voltage of said output;

a communication channel between said microgrid controller and said number of controllers;

a number of microgrid loads powered by said output from said microgrid; and an external protection relay cooperating with said microgrid controller, wherein said external protection relay is structured to measure a rate of change in frequency of an alternating current voltage of said output in response to injection of a unidirectional reactive power dither with respect to the output as commanded by said microgrid controller, and report said rate of change exceeding a predetermined value to said microgrid controller; and wherein said microgrid controller is further structured to, responsive to said rate of change exceeding said predetermined value, (i) determine that said microgrid is islanded and not connected to said grid, (ii) command one or more of said power sources with a positive Q value to cause additional reactive power to flow out of said one or more of said power sources, thereby decreasing the frequency of the alternating current voltage of said output, if the rate of change is positive, and (iii) command one or more of said power sources with a negative Q value to cause additional reactive power to flow into said one or more of said power sources, thereby increasing the frequency of the alternating current voltage of said output if the rate of change is negative.

2. The system of claim 1 wherein said number of power sources are a plurality of power sources; wherein said number of controllers are a plurality of controllers; and wherein said microgrid controller is further structured to command each of said controllers together within said microgrid.

3. The system of claim 1 wherein the controlled reactive power injection is a function of the real power, and independent of a predetermined power factor output from said microgrid; and wherein the perturbation of the reactive power value output by each of said power sources is time synchronized between said power sources within said microgrid.

4. The system of claim 1 wherein each of said number of commands sent by said microgrid controller is a digital signal.

5. The system of claim 1 wherein each of said number of commands sent by said microgrid controller is sent through said communication channel.

6. The system of claim 1 wherein each of said number of commands causes a corresponding predetermined function within a corresponding one of said number of controllers.

7. The system of claim 1 wherein said islanding is detected by each of said number of controllers.

8. The system of claim 1 wherein said number of controllers are structured to detect said islanding and either follow a corresponding one of said number of commands and shut down, or follow an island mode operation command from said microgrid controller.

9. The system of claim 1 wherein a number of said number of commands defines a value of the controlled reactive power injection.

10. The system of claim 1 wherein one of said number of microgrid loads is a controllable reactive load; and wherein one of said number of commands causes the controllable reactive load to turn on in order to cause the controlled reactive power injection.

11. The system of claim 10 wherein said one of said number of microgrid loads is a controllable power factor correction capacitor bank.

12. The system of claim 1 wherein said grid is a utility grid.

13. The system of claim 1 wherein said number of power sources are a plurality of power sources selected from a group consisting of a generator set, a battery and an inverter, and a photovoltaic array and an inverter.

14. The system of claim 1 wherein one of said number of electrical switching apparatus is a microgrid disconnect switch structured to electrically disconnect said output from said microgrid to said grid; wherein said microgrid controller is further structured to open said microgrid disconnect switch and island said microgrid; and wherein each of said number of controllers is structured to monitor a frequency of an alternating current voltage of said output and stop following a corresponding one of said number of commands to said number of controllers after the monitored frequency reaches a predetermined frequency value.

15. The system of claim 1 wherein one of said number of electrical switching apparatus is a microgrid disconnect switch structured to electrically disconnect said output from said microgrid to said grid; and wherein said microgrid controller is further structured to cooperate with said microgrid disconnection switch to electrically disconnect said output from said grid, and a microgrid meter structured to measure reactive power flowing from said output to said grid or from said grid to said output.

16. The system of claim 1 wherein said number of electrical switching apparatus include a microgrid disconnection switch electrically connected to said output; and wherein a number of external loads not part of said microgrid are electrically connected upstream of said microgrid disconnection switch.

17. A method of anti-islanding of a microgrid including a plurality of power sources having an output to a plurality of microgrid loads, said method comprising:
commanding by a processor a number of said power sources or a number of said microgrid loads to inject a unidirectional reactive power dither with respect to said output;
detecting a rate of change of frequency of an alternating current voltage of said output caused by said unidirectional reactive power dither;
in response to determining that the rate of change has a magnitude that exceeds a predetermined value, determining that said microgrid is islanded and not connected to said grid; and
in response to determining said microgrid is islanded and not connected to said grid, sending a number of commands to a number of said number of said power sources in order to control reactive power injection by a number of said number of power sources, wherein said number of commands are a plurality of commands including a real power command and a reactive power command periodically sent from said microgrid controller to each of said controllers over said communication channel, and wherein a reactive power value of said reactive power command is perturbed by a predetermined percentage of the reactive power value of said reactive power command at a predetermined frequency, which is less than a frequency of an alternating current voltage of said output, and wherein in response to determining said microgrid is islanded and not connected to said grid:
(i) if the rate of change of frequency is positive, the method includes commanding each of said power sources with a positive Q value to cause additional reactive power to flow out of said power sources, thereby decreasing the frequency of the alternating current voltage of said output, and
(ii) if the rate of change of frequency is negative, the method includes commanding each of said power sources with a negative Q value to cause additional reactive power to flow into said power sources, thereby increasing the frequency of the alternating current voltage of said output.

18. The method of claim 17 further comprising:
changing by said unidirectional reactive power dither a value of reactive power with respect to said output by a predetermined value within a predetermined time.

19. The method of claim 18 further comprising:
responsive to said changing by said unidirectional reactive power dither, detecting a frequency of the alternating current voltage of said output exceeding a predetermined frequency value;
electrically disconnecting said microgrid from a grid; and
enabling said microgrid to island after it is electrically disconnected from said grid.

20. The method of claim 19 further comprising:
electrically disconnecting said microgrid from said grid when said detected frequency of the alternating current voltage of said output exceeds the predetermined frequency value for a predetermined time.

21. The method of claim 19 further comprising:

starting an anti-islanding function in a controller of any of said number of said power sources operating within said microgrid;

operating said controller in an island mode when a corresponding one of said number of said power sources is electrically disconnected from said microgrid; and following a microgrid reactive power command from said processor when said corresponding one of said number of said power sources is electrically connected to said microgrid.

* * * * *